United States Patent [19]
Dunckley et al.

[11] Patent Number: 5,243,481
[45] Date of Patent: Sep. 7, 1993

[54] CLAMP FOR INFORMATION STORAGE DISK

[75] Inventors: James A. Dunckley, Boulder; Robert A. Alt, Longmont, both of Colo.

[73] Assignee: Integral Peripherals, Inc., Boulder, Colo.

[21] Appl. No.: 765,358

[22] Filed: Sep. 25, 1991

[51] Int. Cl.$^5$ .............................. G11B 17/02
[52] U.S. Cl. ............... 360/99.08; 360/98.07; 360/98.08; 360/99.12
[58] Field of Search .......... 360/99.08, 99.12, 99.05, 360/99.04, 98.08, 98.07, 98.02, 98.01, 97.03; 369/270, 271, 264, 263, 258, 75.2

[56] References Cited

U.S. PATENT DOCUMENTS

| | | |
|---|---|---|
| 3,299,581 | 1/1967 | Price et al. |
| 4,125,883 | 11/1978 | Rolph |
| 4,409,629 | 10/1983 | Puls |
| 4,420,830 | 12/1983 | Green |
| 4,497,003 | 1/1985 | Abe et al. |
| 4,502,136 | 2/1985 | Rickert et al. |
| 4,510,592 | 4/1985 | Kanamaru et al. |
| 4,539,614 | 9/1985 | Thompson |
| 4,627,288 | 12/1986 | Guzik et al. |
| 4,649,531 | 3/1987 | Horowitz et al. ............... 369/270 |
| 4,705,279 | 11/1987 | Mizukami et al. |
| 4,734,813 | 3/1988 | Bessho |
| 4,736,358 | 4/1988 | Hoshi et al. |
| 4,747,002 | 5/1988 | Takikawa et al. |
| 4,755,981 | 7/1988 | Ekhoff |
| 4,760,477 | 7/1988 | Takikawa |
| 4,799,209 | 1/1989 | Grobben |
| 4,827,364 | 5/1989 | Sheriff |
| 4,829,501 | 5/1989 | Seto et al. |
| 4,841,517 | 6/1989 | Kurihara et al. |
| 4,864,443 | 9/1989 | Peterson |
| 4,901,173 | 2/1990 | Jones et al. |
| 4,920,437 | 4/1990 | Washo et al. |
| 4,958,839 | 9/1990 | Guzik et al. ............ 360/99.12 |
| 5,001,700 | 3/1991 | Rowden et al. |

*Primary Examiner*—David P. Porta
*Attorney, Agent, or Firm*—Skjerven, Morrill, MacPherson, Franklin & Friel

[57] ABSTRACT

A clamp for mounting an information storage disk on a hub or spindle includes an annular member which surrounds the hub and has fingers which exert outward radial forces on the inside edge of the disk. A series of L-shaped legs also extend from the annular member and impose axial forces on a flat surface of the disk, the total axial force being smaller than the sum of the radial forces. The clamp is made of a spring-like material and is held in place by a series of inwardly extending nubs which make contact with the hub.

29 Claims, 17 Drawing Sheets

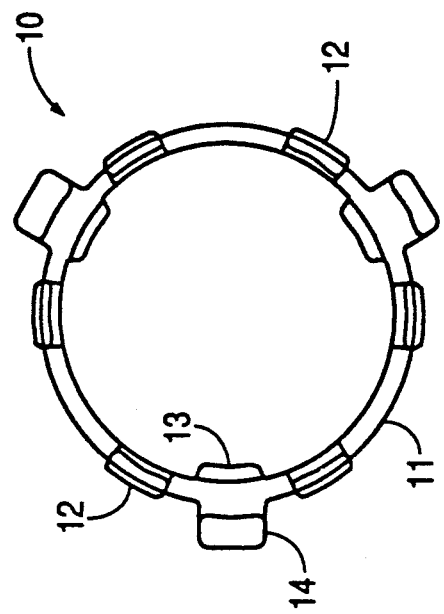
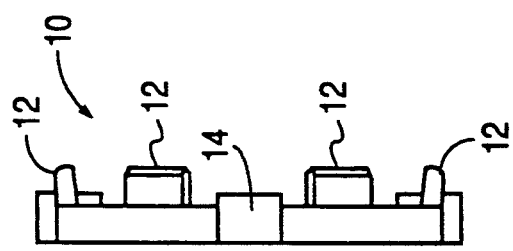
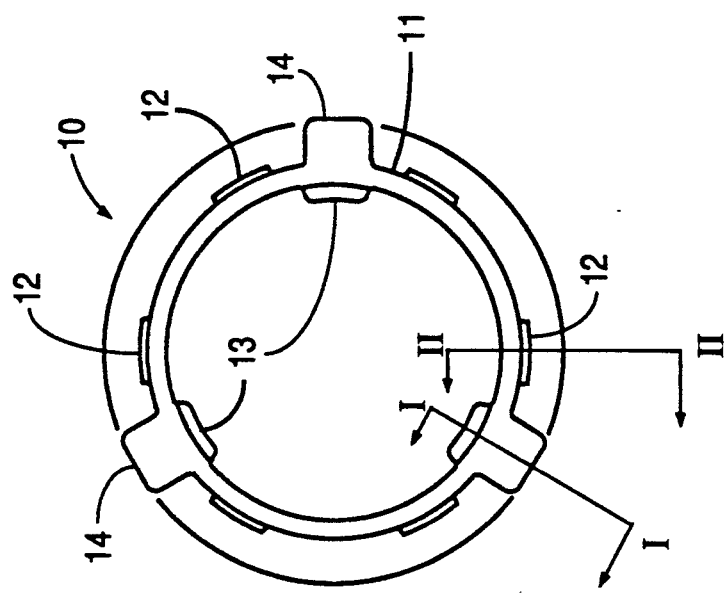

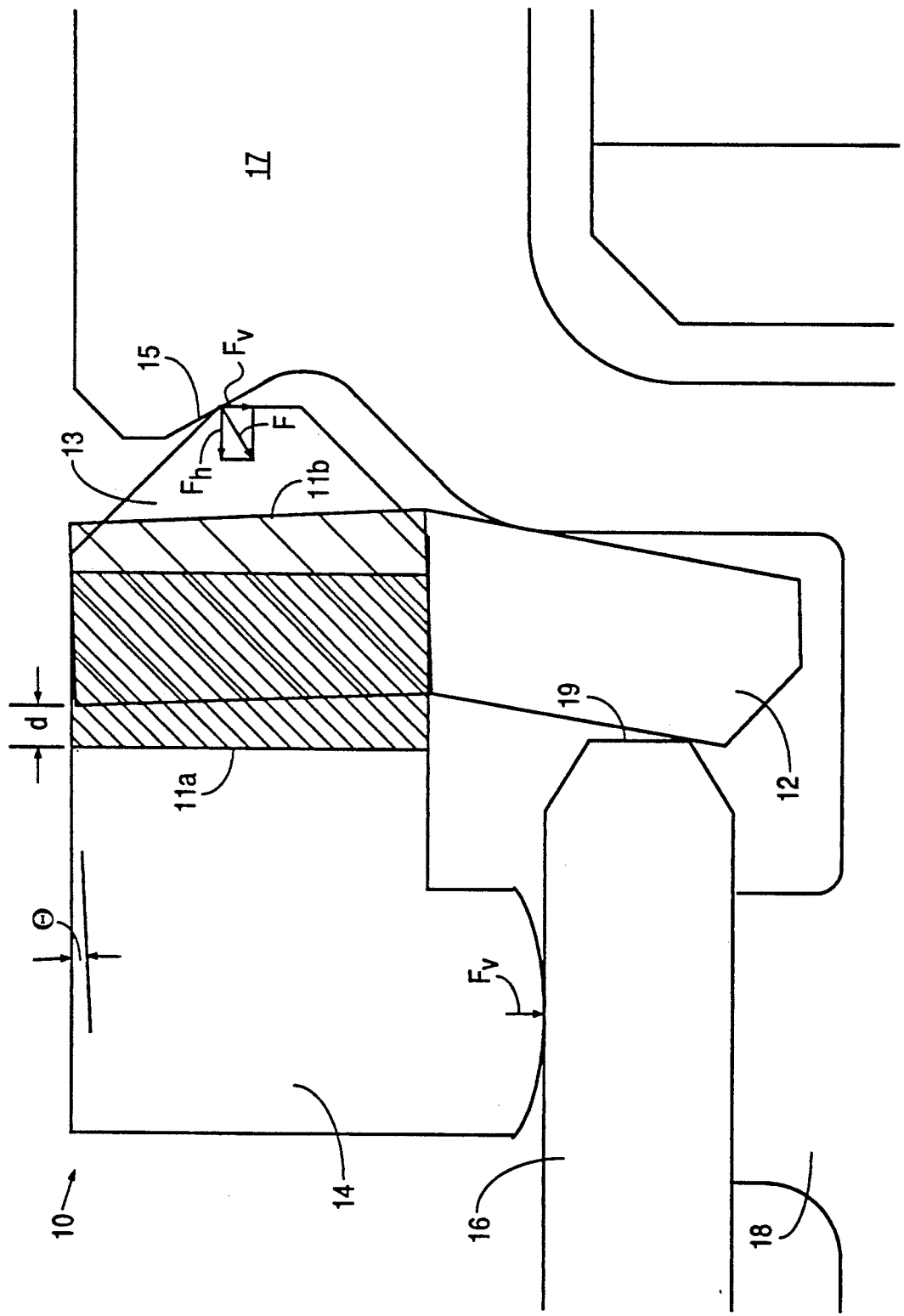

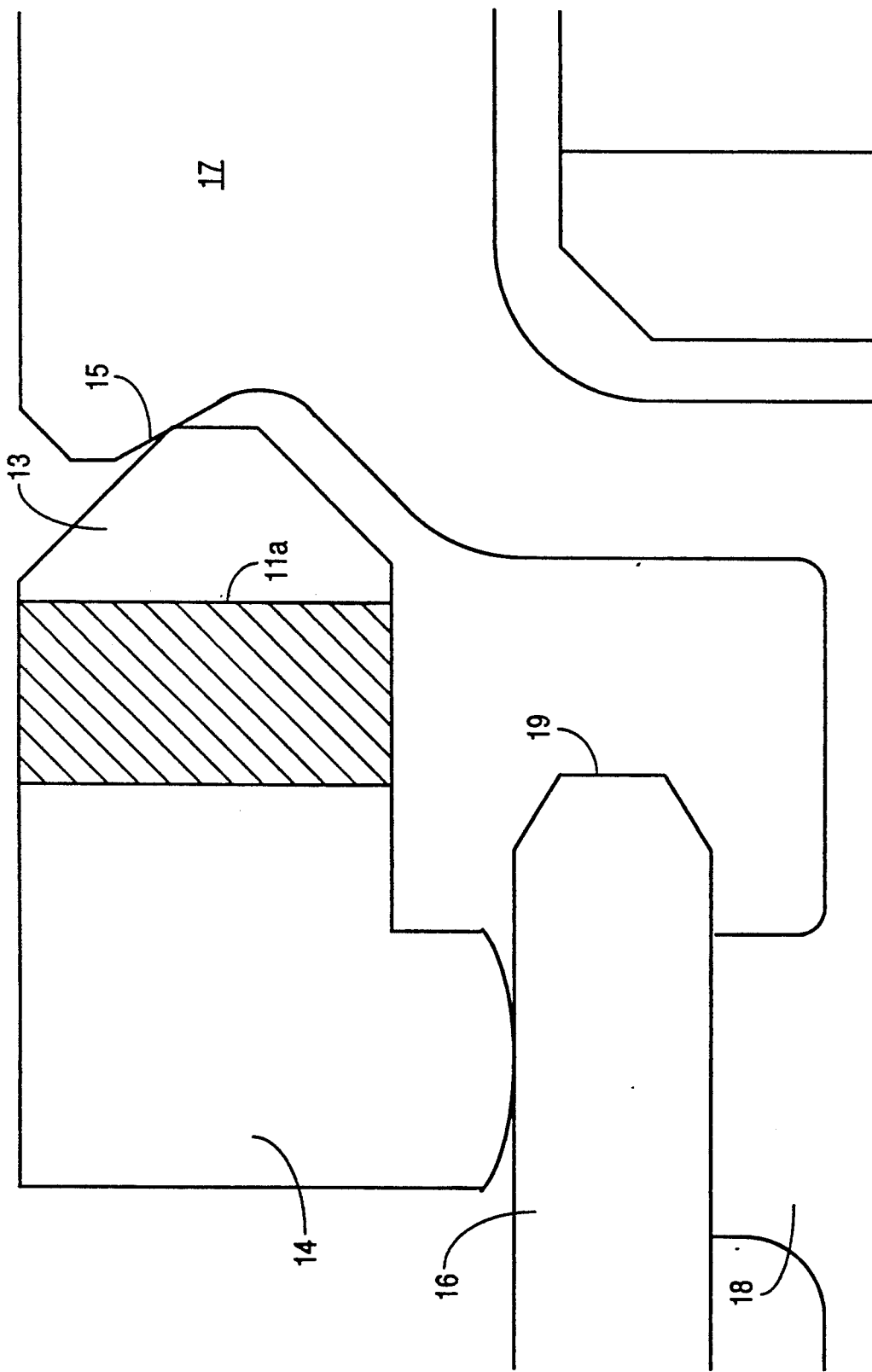

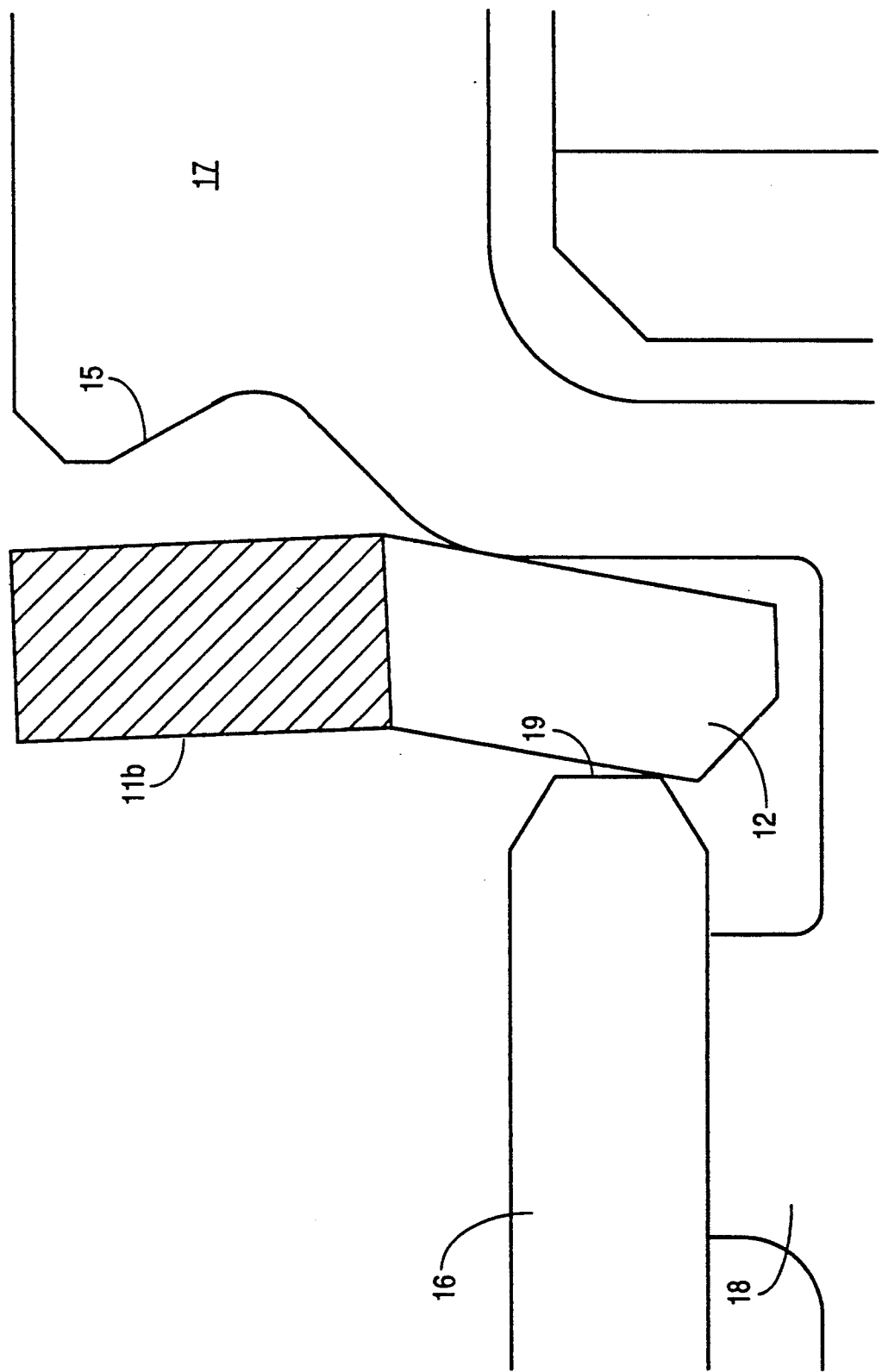

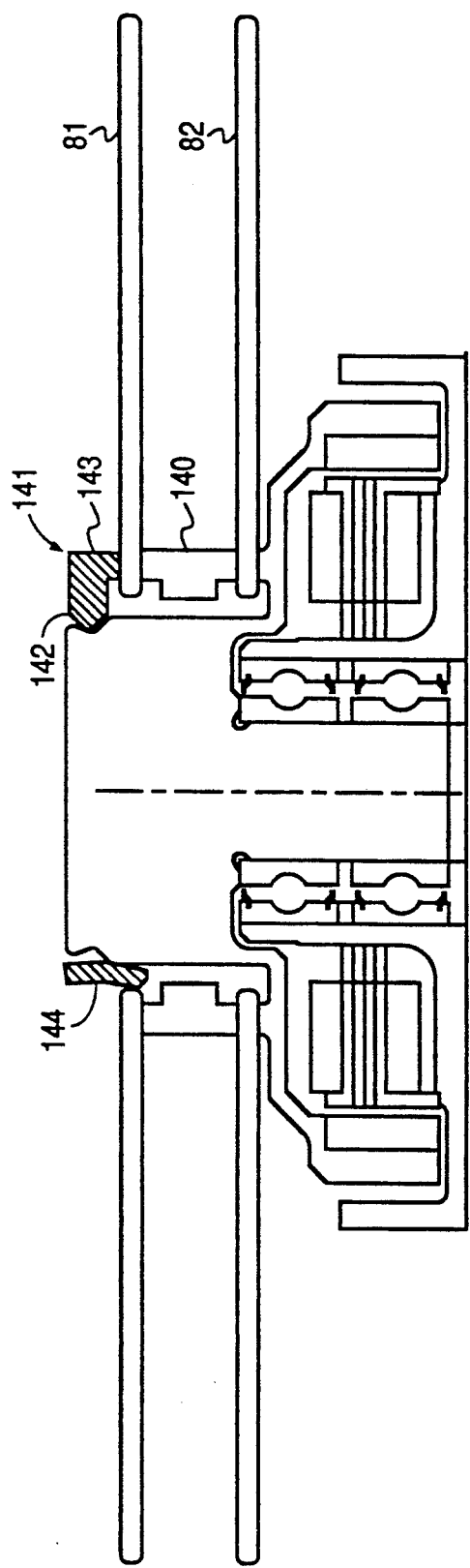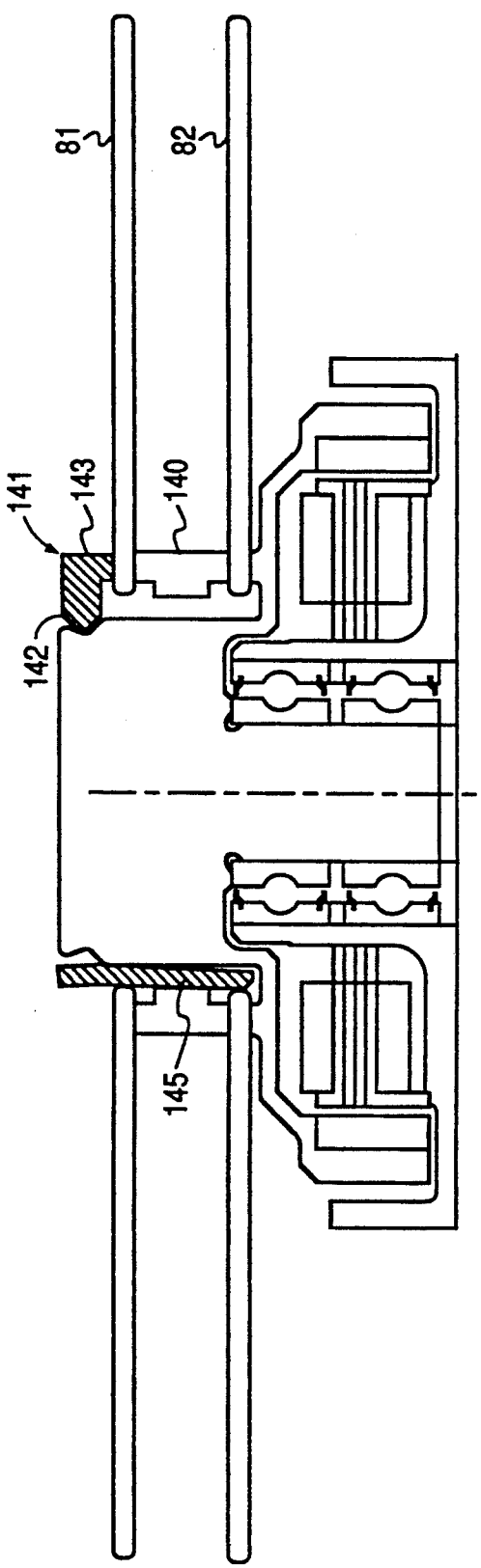

CLAMP FOR INFORMATION STORAGE DISK

FIELD OF THE INVENTION

This invention relates to devices for clamping an information storage disk to a hub or spindle and, in particular, to a clamp which secures the disk by providing a primarily radial force against the inside edge of the disk.

BACKGROUND OF THE INVENTION

A clamping device for an information storage disk must satisfy several conditions. First, it must secure the disk firmly enough to prevent slippage when a rotational force is applied to the disk during acceleration or deceleration. The clamping force must also be strong enough to resist any external side shock loads which are imposed on the disk drive. It must avoid distorting the disk. It must be easy to install and remove without damaging the disk or spin motor. It should minimize the amount of particulate debris which is generated during assembly of the disk in the drive. It should be perfectly balanced and should be manufactured from materials that do not outgass or otherwise contaminate the disk.

Most prior art clamps are "axial clamps" which rely on a force parallel to the axis of the drive shaft ("axial force") that is imposed on a flat annular region near the inside edge of the disk. The clamp forces the disk against a flange on the drive motor hub or against a spacer (in a multidisk arrangement). Friction between the disk surface and the clamp or spacer, or the hub flange, provides a force which resists slippage between the disk and its neighboring components in a circumferential or radial direction. The clamping force is typically provided by one or more screws, which are tightened to grip the disk between the clamp or spacer and the hub flange, the latter of which establishes the correct elevation of the disk in relation to the read/write head.

This type of clamp presents several problems. First, the axial clamping force is rarely strong or uniform enough to prevent the disk from shifting off center when the disk drive is subjected to a shock force. Second, the various components normally have different coefficients of thermal expansion, and thus the clamping force may vary as the drive is subjected to different temperatures within its operating range (typically −40° C. to +60° C.). Moreover, the surfaces rarely mate perfectly, and as the temperature varies, one or more points on the disk will tend to stick to the clamp, while other points become free to shift. This can also lead to an eccentric disk. When the disk shifts for whatever reason, the data which have been written on the disk will become eccentric.

The lack of perfect mating between an axial clamp and a disk also causes the clamp to warp the disk into various shapes. Depending upon the exact nature of the mismatch, the disk may be warped into the shape of a cone or a "taco", or relatively short wavelength ripples or bumps may appear in the disk. Any of these deformations may cause problems for current low-flying heads which are typically separated from the surface of the disk by approximately 5 microinches. The length of a typical air bearing surface is approximately 0.1 inches, or 100,000 microinches. Curvature of the disk surface of only 1 microinch in this distance will create an error in the gap between the disk and head of about 0.5 microinches.

In an attempt to overcome these problems, elastomeric or polymeric washers have been placed between the disk and the clamp and hub, or between the disks and spacers in a multidisk stack arrangement. Using these deformable elements can create problems with tolerances, structure and part count, however, and elastomeric materials are likely to be sources of outgassing contamination.

Moreover, as noted above, axial clamps are typically tightened with one or more screws. This process tends to create side loads during installation that force the disks and spacers against one side of the hub, thereby imbalancing the structure. The task of balancing disks that have been mounted in this way is a time-consuming but necessary part of the manufacturing process.

SUMMARY OF THE INVENTION

A disk clamp of this invention operates primarily by providing a radial force against the inside edge of a disk. The clamp may be manufactured from a spring-like material, such as a plastic, and is in an essentially annular shape which fits around the hub. A series of fingers exert outward radial forces on the inside edge of the disk, and a series of nubs are arrayed around the inside surface of the clamp and make contact with the hub. A series of outwardly extending legs, which may be L-shaped, contact and provide a relatively small axial force against the flat surface of the disk. The disk is held in place primarily by the outwardly directed radial forces provided by the fingers and secondarily by the axial forces provided by the legs. The latter forces are only large enough to ensure that the disk is properly seated on a spacer or mounting face of the hub.

The clamp of this invention has numerous advantages, including the following: it features one-piece construction; any debris generated during assembly will be a relatively soft material, such as plastic, instead of metal; it assures that the disk will be properly centered, so that the time-consuming step of balancing the disk may be eliminated; the axial force on the disk is minimized so as to reduce warpage; the forces imposed on the disk do not vary appreciably with changes in temperature; and the concept is readily adaptable to structures including two or more disks.

DESCRIPTION OF THE DRAWINGS

FIGS. 1A, 1B and 1C are top plan, bottom plan and side elevational views, respectively, of an embodiment of a clamp in accordance with the invention.

FIGS. 3 and 4a and 4b are detailed views of the fingers, nubs and L-shaped legs in relation to a disk and a hub, when the clamp is in a stressed condition.

FIGS. 8–10, 11a, 11b, 11c, 12a, 12b, 12c, 13, 14a and 14b illustrate alternative embodiments according to this invention.

DESCRIPTION OF THE INVENTION

Figure 2:
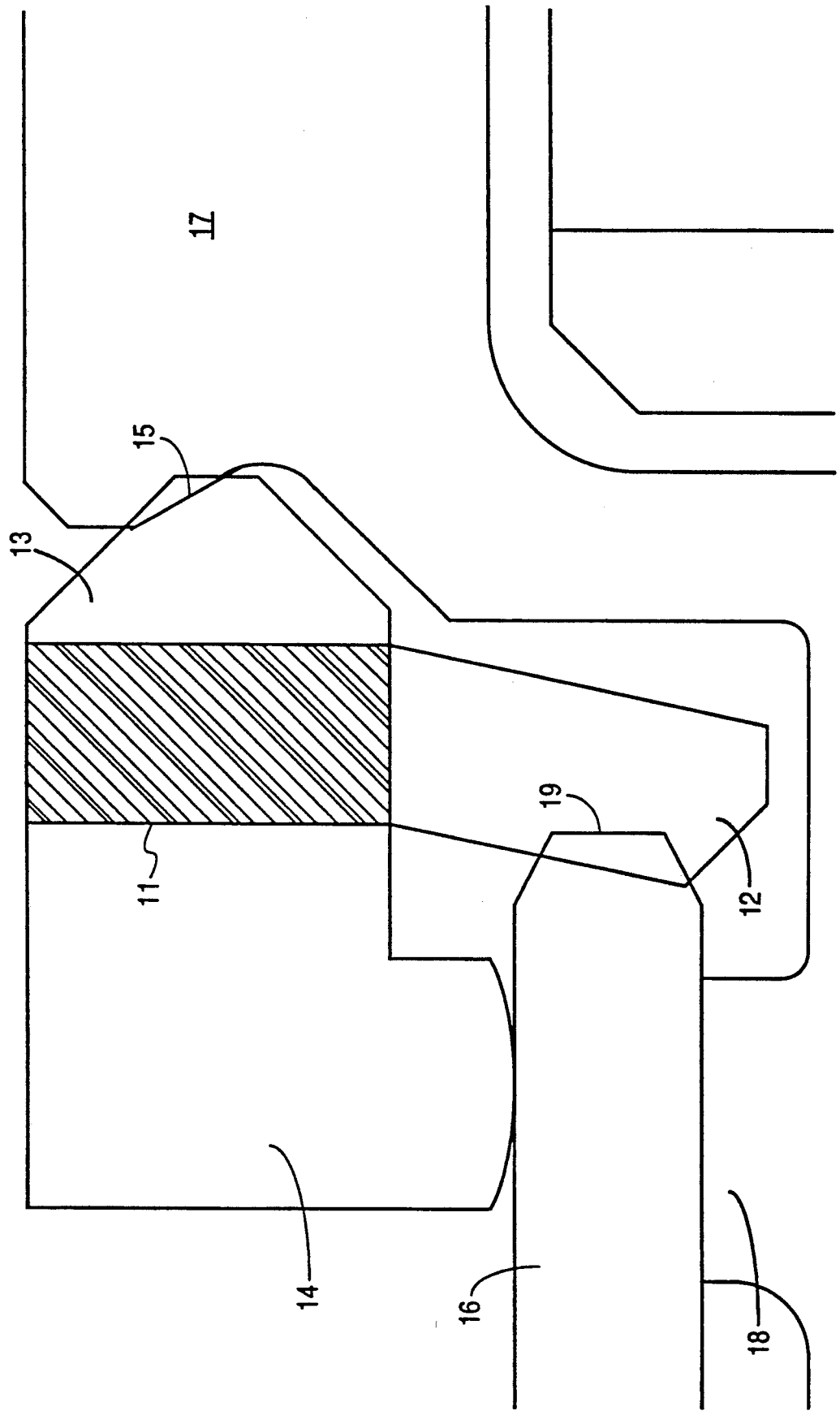
FIG. 2 is a detailed view of the fingers, nubs and L-shaped legs in relation to a disk and a hub, when the clamp is in an unstressed condition.

FIGS. 1A, 1B and 1C are top plan, bottom plan and side elevational views of a clamp 10 in accordance with the invention. Clamp 10 includes a basic annular ring 11 around which are integrally formed fingers 12, nubs 13 and L-shaped legs 14. As can be seen from FIG. 1C, fingers 12 extend in the same direction from annular ring 11 and are inclined slightly outwardly. The shape of nubs 13 and L-shaped legs 14 can best be seen from FIGS. 2 and 3.

In this preferred embodiment, clamp 10 is made of a plastic material which is deformed or stressed slightly when it is placed in use. FIGS. 2 and 3 show clamp 10 in an unstressed and stressed condition, respectively. FIGS. 2 and 3 are composite views which show nubs 13 and L-shaped legs 14 taken through cross section I—I shown in FIG. 1A, and fingers 12 taken through cross section II—II, shown in FIG. 1A. The cross section of unstressed annular ring 11 is shown in FIG. 2, and the cross sections of stressed annular ring 11 are shown as 11a and 11b in FIG. 3. 11a represents the position of annular ring 11 at cross section I—I in FIG. 1A; 11b represents the position of annular ring 11 at cross section II—II in FIG. 1A.

As can be seen from FIGS. 2 and 3, nub 13 makes contact with an inclined (conical) surface 15 of a hub 17 which tends to force nub 13 (and L-shaped leg 14) downward and outward (to the left in FIGS. 2 and 3). That is, the force vector F imposed on nub 13 is essentially normal to inclined surface 15, as shown by the arrow in FIG. 3. The vertical component $F_v$ of the force vector F causes L-shaped leg 14 to apply an axial force $F_v$ against a disk 16, thereby forcing it against a flat portion 18 of hub 17. The horizontal component $F_h$ of the force vector F causes annular ring 11 to be deformed outwardly, as reflected by cross section 11a.

FIGS. 4A and 4B are similar to FIG. 3, but show separate views taken at cross sections I—I and II—II respectively, of FIG. 1A.

Figure 5:
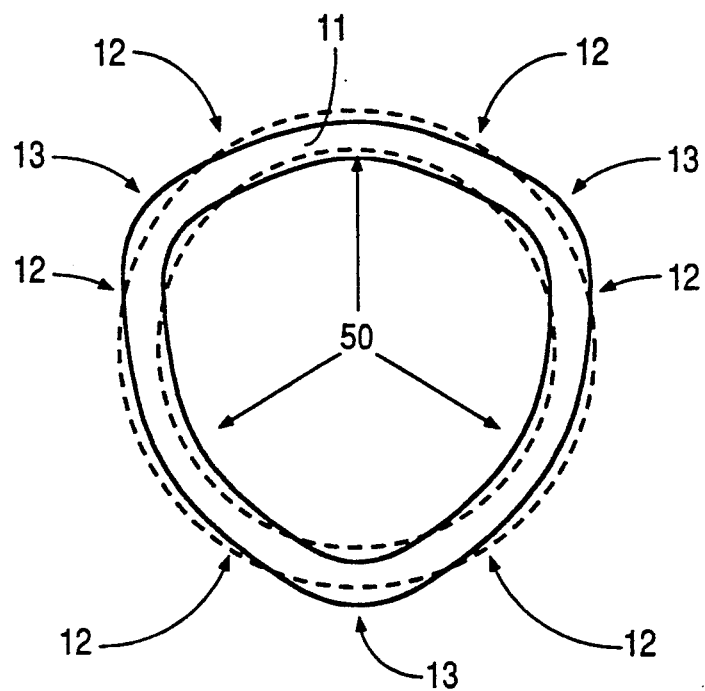
FIG. 5 is a top view of the annular ring of the clamp in a stressed and unstressed condition.

The deflection of annular ring 11 as a result of the horizontal force component $F_h$ is illustrated (in a somewhat exaggerated fashion) in FIG. 5. The unstressed shape of annular ring 11 is shown in hatched lines. The stressed shape of annular ring 11 is shown in solid lines. The positions of nubs 13 have been pushed radially outward while the midpoints 50 between nubs 13 have been drawn radially inward. It will be noted that the positions of the fingers 12 are approximately the same in the stressed and unstressed conditions.

Referring again to FIGS. 2 and 3, it is apparent that in the stressed condition finger 12 applies an outward radial force against an edge 19 of disk 16. This outward radial force, which is critical in clamping disk 16, is the sum total of three components: (i) the bending or deflection of annular ring 15 in the horizontal plane, represented by the distance d in FIG. 3; (ii) the twisting or torsion of annular ring 15, represented by the angle $\theta$ in FIG. 3; and (iii) the bending or flexure of finger 12. In the embodiment shown, components (i) and (ii) are of greater significance than component (iii).

The magnitude of components (i) and (ii) is a function of stiffness of the material of which annular ring 11 is made as well as the size and shape of the cross section of annular ring 11 The magnitude of component (iii) is a function of the same factors with respect to fingers 12.

Figure 6:
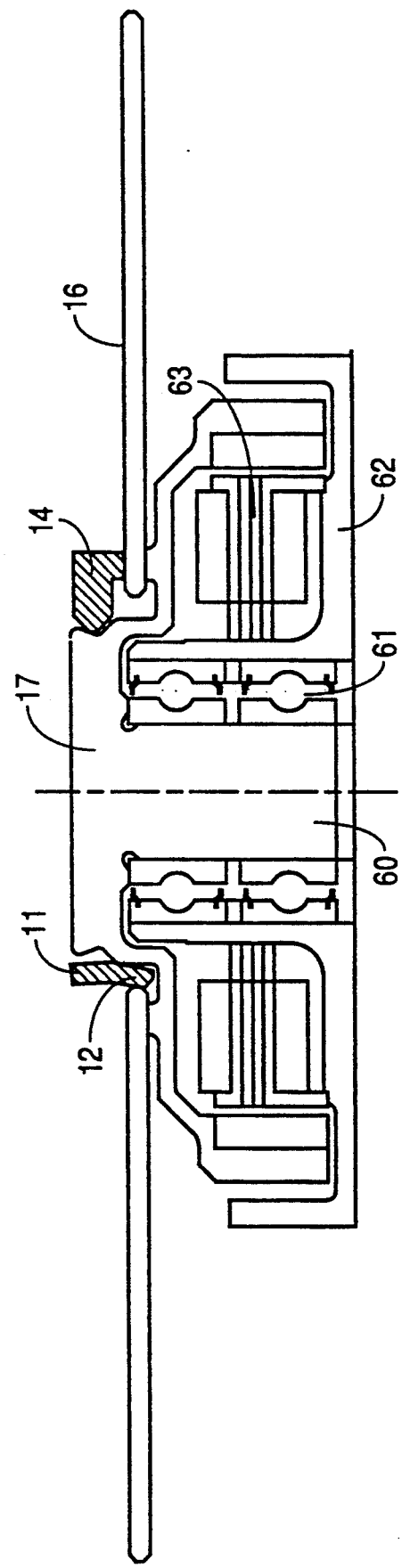
FIG. 6 is an overall cross-sectional view showing how a disk is mounted with the clamp of this invention.

An overall cross-sectional view showing the manner in which disk 16 is clamped to hub 17 is shown in FIG. 6. Included are a central shaft 60 which rotates by means of bearings 61 within a stationary base 62. Hub 17 is driven by a wound stator 63.

The arithmetic sum of the radial forces applied by fingers 12 (i.e., the sum of the absolute magnitude of those forces) is substantially greater than the sum of the downward (axial) forces applied to disk 16 by L-shaped legs 14. The axial forces are just sufficient to seat disk 16 against the flat portion 18 of hub 17 and not enough to cause warpage in disk 16. The radial forces provided by fingers 12 are strong enough to produce a static frictional force tangential to edge 19 at the location of each finger 12 so as to prevent disk 16 from slipping when it is accelerated or decelerated in a rotational direction.

Figure 7:
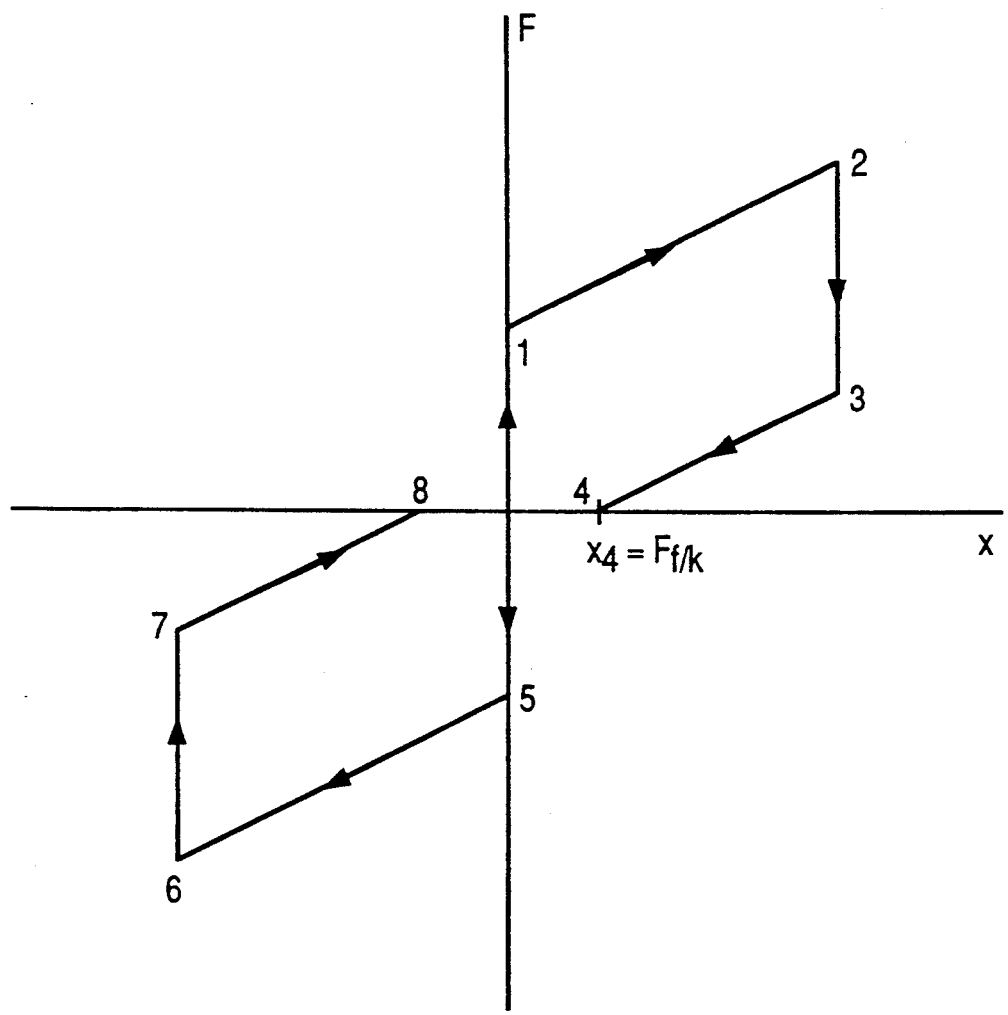
FIG. 7 is a graph illustrating the behavior of a clamp according to this invention when subjected to a shock force.

The behavior of disk 16 in the presence of an inertial shock force can be approximated by reference to the graph shown in FIG. 7, the horizontal axis of which represents the horizontal displacement of disk 16 from center (the origin), and the vertical axis which represents the horizontal component of a shock force imposed on disk 16.

For purposes of this analysis, it is assumed that essentially two types of forces are imposed on disk 16 as a result of its interaction with clamp 10 and hub 17: (i) a dynamic force $F_d$, which increases linearly with the displacement of disk 16 from the origin, and (ii) a static frictional force $F_f$, which results from the contact of disk 16 with clamp 10 and hub 17. The dynamic force $F_d$ can be represented as:

$$F_d = kx \tag{1}$$

where k is the stiffness of clamp 10 and x is the horizontal displacement of disk 16. k is a function of the stiffness of the material of which clamp 10 is made and represents the combined effect of the three elements described above, namely, the bending or deflection of annular ring 15, the twisting or torsion of annular ring 15, and the bending or flexure of fingers 12.

The frictional force $F_f$ is approximated by the following formula:

$$F_f = 3\, F_n \mu_{cd} + 3\, F_n \mu_h d2\, F_{finger}\, \mu_{cd} \tag{2}$$

where $F$, is the total frictional force on disk 16, $F_n$ is the normal force imposed on disk 16 by each of L-shaped legs 14, $F_{finger}$ is the radial force imposed on disk 16 by each of fingers 12, and $\mu_{cd}$ and $\mu_{hd}$ are the coefficients of friction between the clamp and disk and the hub and disk, respectively. The formula thus sums the frictional forces at each of the points of contact between disk 16 and L-shaped legs 14, flat portions 18, and fingers 12. It is assumed that two fingers 12 are displaced 90° from the direction of the shock force and a frictional force arises from the contact of these fingers 12 and inside edge 19 of disk 16.

Referring again to FIG. 7, when the disk is centered it is held in place by the frictional force $F_f$. It will remain centered unless the shock force imposed on it exceeds $F_f$. This region is represented by the line from the origin to point 1 in FIG. 7.

If the shock force exceeds $F_f$, the disk will be displaced until the sum of F, and the dynamic force $F_d$ imposed by clamp 10 matches the magnitude of the shock force, as represented by point 2. Point 2 is not an equilibrium point, however, because the frictional force which opposed the displacement of disk 16 disappears as soon as disk 16 comes to a halt. This is represented by point 3, which also takes into account that disk 16 experiences an outward frictional force as soon as it begins to return to the origin. Disk 16 thus returns to point 4, where the frictional force is equal to the dynamic force imposed by clamp 10. At point 4, $$F_f = F_d = kx$$

thus, the abscissa $x_4$ of point 4 is equal to $$x_4 = F_f/k$$

If disk 16 is subjected to a shock force in the opposite direction, it will pass through points 5, 6 and 7 in the same manner and end up at point 8. It should be noted that points 4 and 8 are worst cases; shock forces often occur in groups and may result in the disk coming to rest somewhere on the x axis between points 4 and 8.

In designing clamp 10, it is desirable to minimize the final displacement of disk 16 ($F_f/k$). This can be accomplished either by increasing the stiffness k or reducing the normal force $F_n$ on disk 16, which determines the frictional force $F_f$. Reducing the frictional force $F_f$ is not desirable, however, because this force provides the initial "stickiness" which prevents disk 16 from being displaced at all when it is subjected to minimal shock forces (i.e., shock forces located along the line from the origin to point 1 in FIG. 7). The alternative is to increase the stiffness of clamp 10. This can be accomplished by: (i) making clamp 10 from a material with a higher Young's modulus, (ii) increasing the thickness of annular ring 15, or (iii) reducing the preload dimensions of clamp 10. The problem with making clamp 10 from a material with a higher Young'odulus (e.g., a metal or reinforced plastic material) is that these materials may not be able to withstand the distortion required to install disk 16 on clamp 10. Increasing the thickness of annular ring 15 may also result in problems resulting from installation distortion.

As an example, assume that the normal force $F_n$ imposed by each of L-shaped legs 14 is 49.6 gmf, the radial force $F_{finger}$ imposed by each of fingers 12 is 174 gmf, and $\mu_{cd}$ and $\mu_{hd}$ are each 0.3. Equation (2) yields an $F_f$ equal to 193.7 gmf. If the mass of disk 16 is 3 gm, the external "G" shock necessary to shift disk 16 is: 193.7 gmf/3gm = 64.6 G. This is substantially above typical operating shock specifications which are in the range of 10-20 G.

A clamp 10 made of polycarbonate has a k of 4108 gmf/mm. Applying equation (1), this yields equilibrium displacement $x_4 = 193.7$ gmf/4108gmf/mm = 0.047 mm = 0.001856 in. If the data are Written at 2000 tracks per inch, this represents a displacement of 3.7 tracks. This error is within the range that can be corrected by once-around servo compensation schemes such as the one disclosed in Application Ser. No. 07/766,478, entitled "Adaptive Runout Compensation System for Miniature Disk Drive", by Thomas L. Andrews, Jr., co-owned, commonly assigned, and filed concurrently herewith.

Temperature variations are another possible cause of eccentricities in disk drives. The hubs are normally manufactured of steel and the disks are manufactured of aluminum, which have different coefficients of thermal expansion. Using axial clamping, it is virtually impossible to restrain all relative motion between the disk and hub as the temperature changes. What normally happens is that the clamp has a maximum clamping force at one point on the disk. This point becomes a "sticking point" and the disk and hub will slide with respect to one another in an area opposite the sticking point, thereby producing an eccentricity. Every temperature change has the potential of producing another unpredictable and non-repeatable eccentricity.

With the clamp of the this invention, the principal clamping force is radial, and the disk and hub are free to move relative to each other while the clamp maintains them in a concentric relationship. Thus, temperature changes should not produce eccentricities like those generated in axial clamping schemes.

In this embodiment, clamp 10 is manufactured of polycarbonate, but other plastics and spring-like materials are also suitable for this purpose. One such material is a liquid crystal polymer known as Vectra TM manufactured by Hoechst-Celanese Corporation of Chatham, N.J. The most important characteristic of the material is that it be spring-like, i.e., that it have a linear stress-to-strain curve.

While the embodiment described above includes three nubs 13 and L-shaped legs 14 and six fingers 12, these numbers are not critical. Other clamps according to this invention may include a fewer or greater number of nubs, L-shaped legs and fingers. Similarly, while nubs 13 are lined up with L-shaped legs 14 in this embodiment, this need not be the case.

Figure 8:
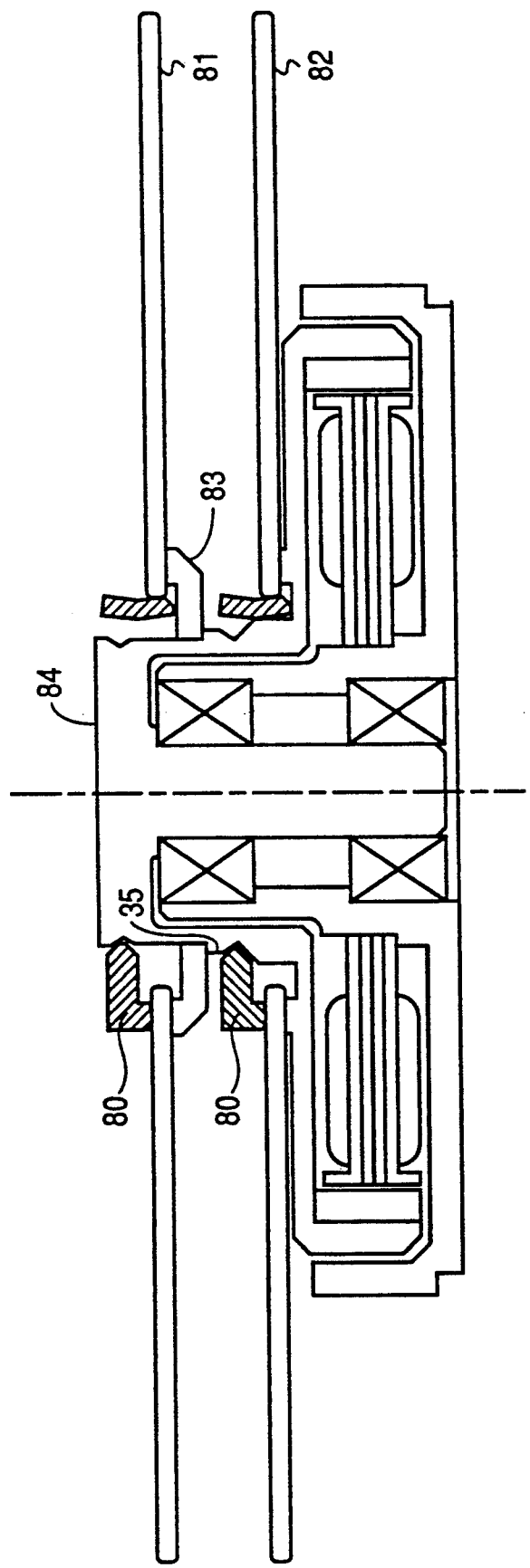

FIGS. 8-14 illustrate a number of alternative embodiments in accordance with the invention. FIG. 8 shows a two-disk arrangement in which two clamps 80 are used to mount disks 81 and 82, respectively. Clamps 80 are substantially similar to clamp 10. An annular flange 82 slips over hub 83 and rests on a circular step 84 formed in hub 83.

Figure 9:
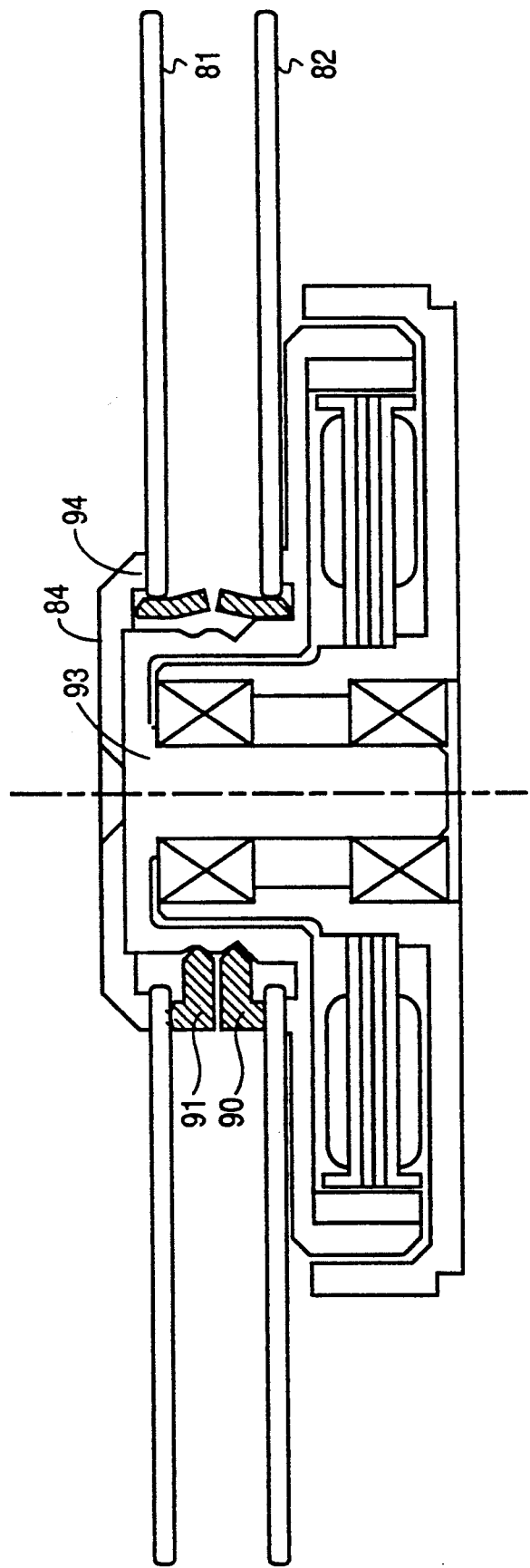

FIG. 9 illustrates an alternative two-disk arrangement in which the upper clamp 91 is inverted. Again, clamps 90 and 91 are substantially similar to clamp 10. A circular flange 92 is screwed concentrically to the top of hub 93 and has an annular surface 94 against which disk 81 is pressed by clamp 91.

Figure 10:
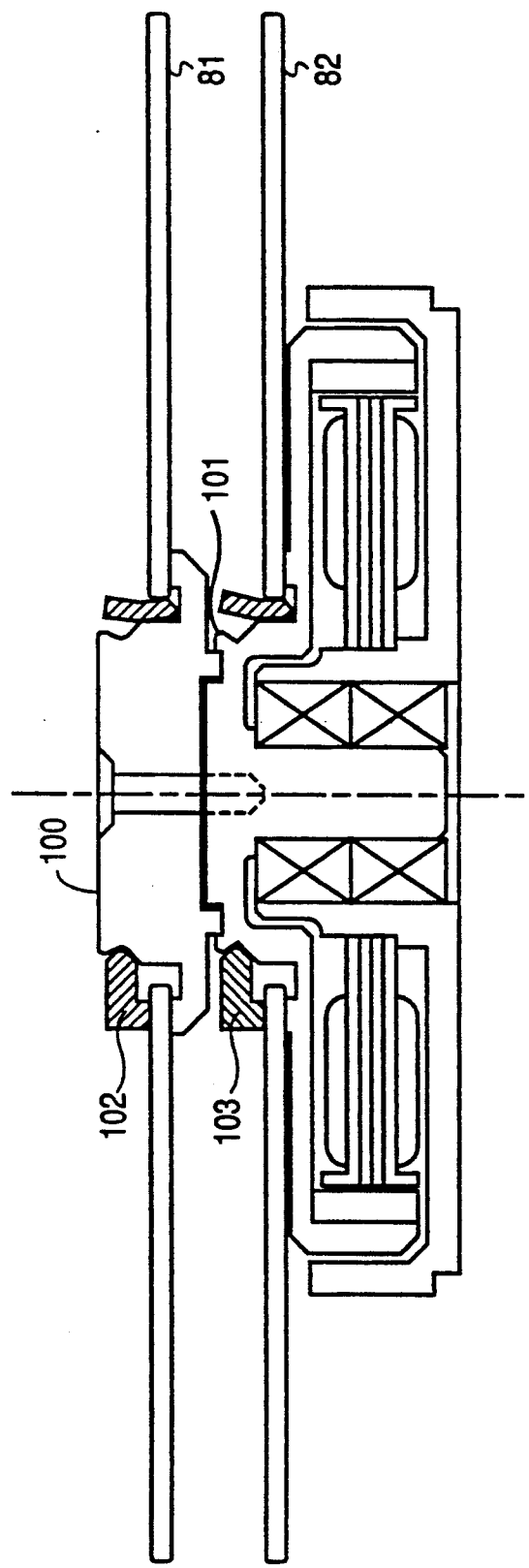

FIG. 10 illustrates a two-disk arrangement in which a secondary hub 100 is screwed onto a primary hub 101. Clamps 102 and 103 are substantially similar to clamp 10.

Figure 11A:
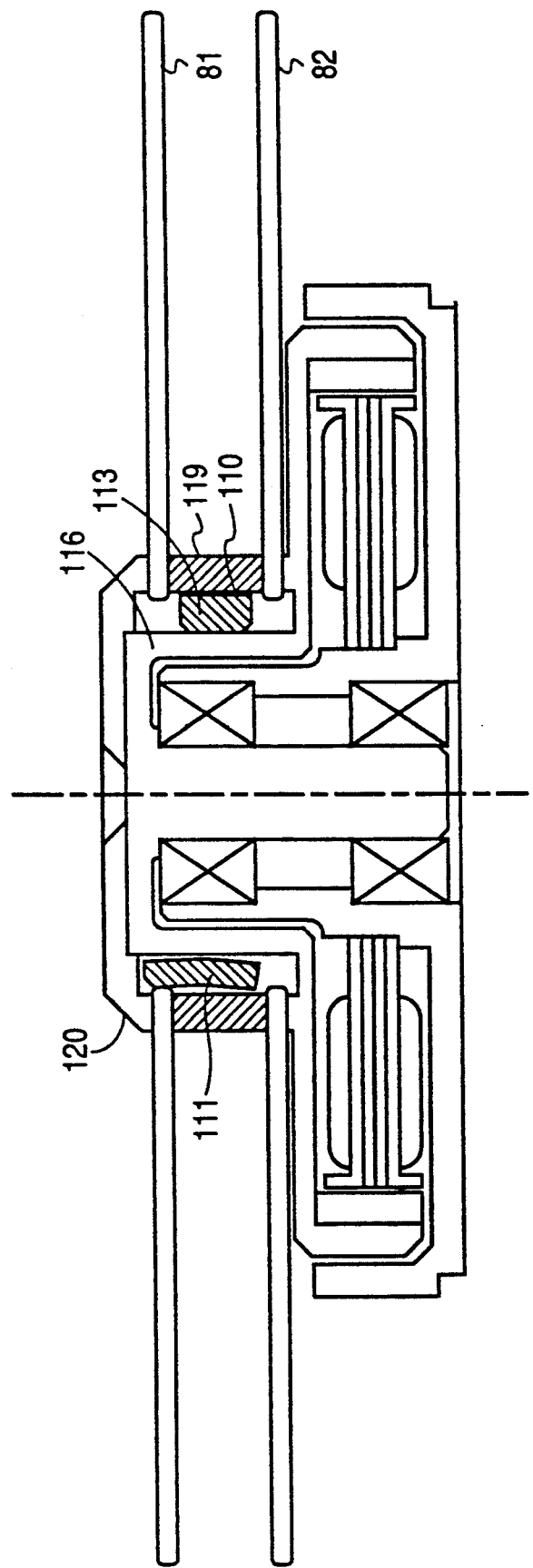
Figure 11B:
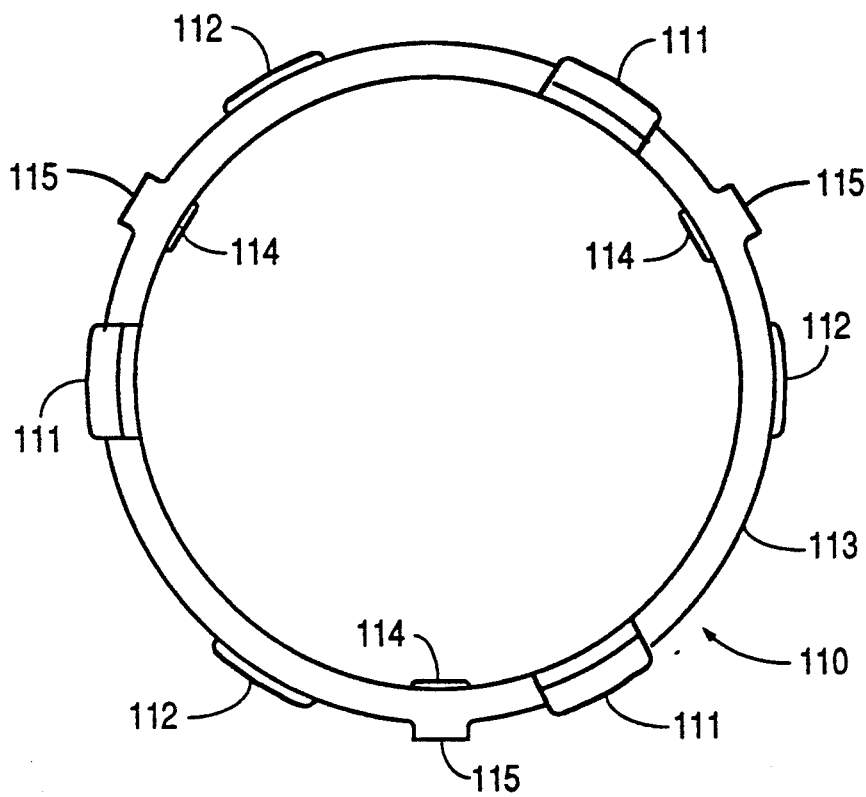
Figure 11C:
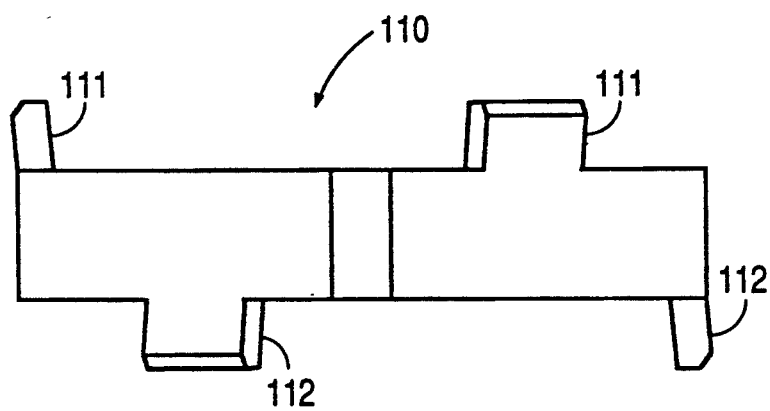

FIG. 11 illustrates a substantially different radial clamp 110 which (as shown in FIGS. 11B and 11C) has three upwardly projecting fingers 111 and three downwardly projecting fingers 112. On the inside circumference of annular ring 113, three contact surfaces 114 are located and opposite them, projecting outwardly, are three locating surfaces 115. Radial clamp 110 does not include elements comparable to the nubs 13 or L-shaped legs 14 of clamp 10.

Clamp 110 is press-fitted over a hub 116, with the actual contact being at contact surfaces 114. Upper disk 81 is held in position radially by fingers 111 and lower disk 82 is held in position by fingers 112. A solid annular spacer 117 fits around radial clamp 110, coming into contact with locating surfaces 115, and separates disks 81 and 82. An upper flange 118 is screwed into hub 116 and tightened sufficiently to provide a proper axial force (approximately 0.5 pounds) against disks 81 and 82. This axial force is transmitted from disk 81 to disk 82 by means of spacer 117. Spacer 117 and upper flange 118 can be made of plastic or metal. If desired, radial clamp 110 can be split into two annular pieces, one piece carrying upwardly projecting fingers 111 and the other piece carrying downwardly projecting fingers 112. This may allow the addition of more radial fingers and simplify the design of the mold for manufacturing the clamps.

Figure 12A:
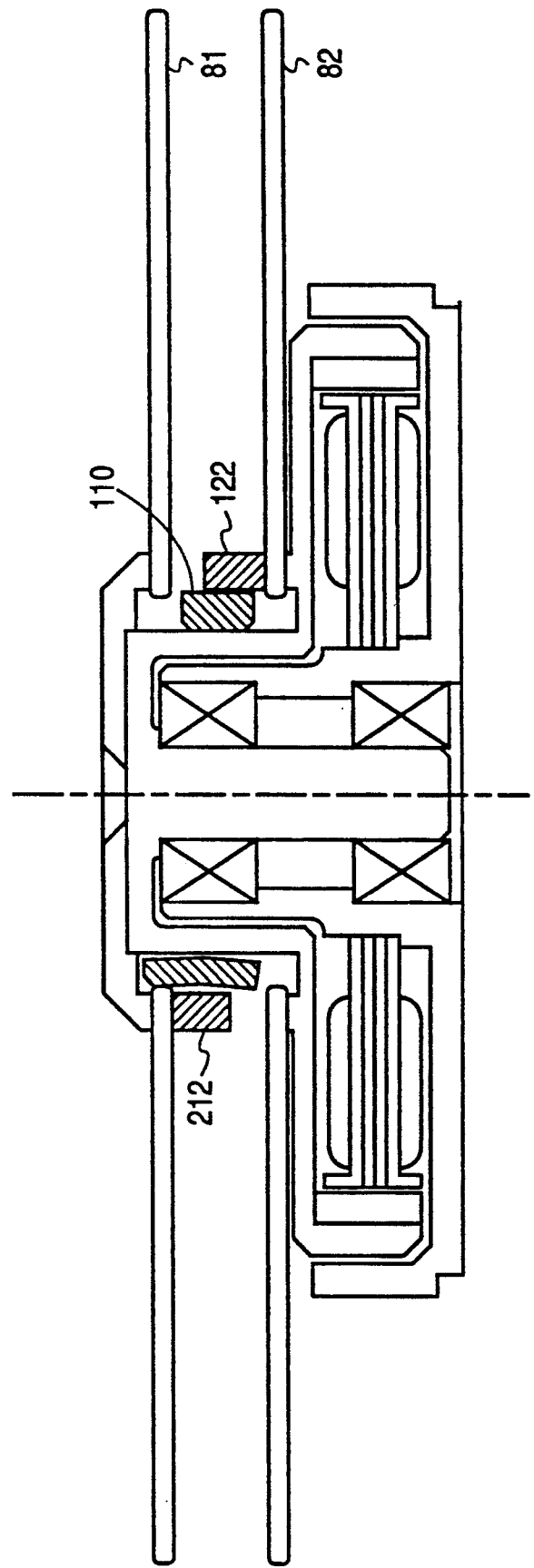
Figure 12C:
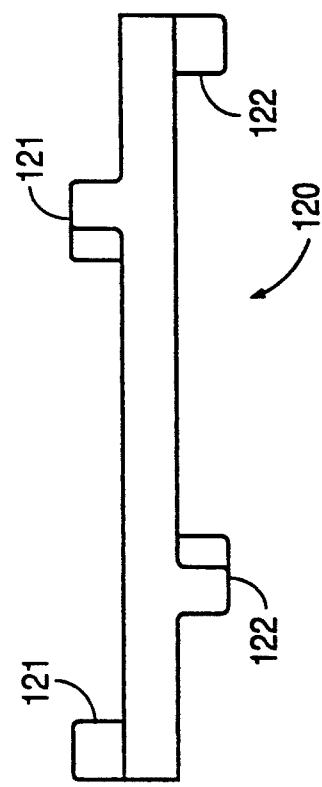
Figure 12B:
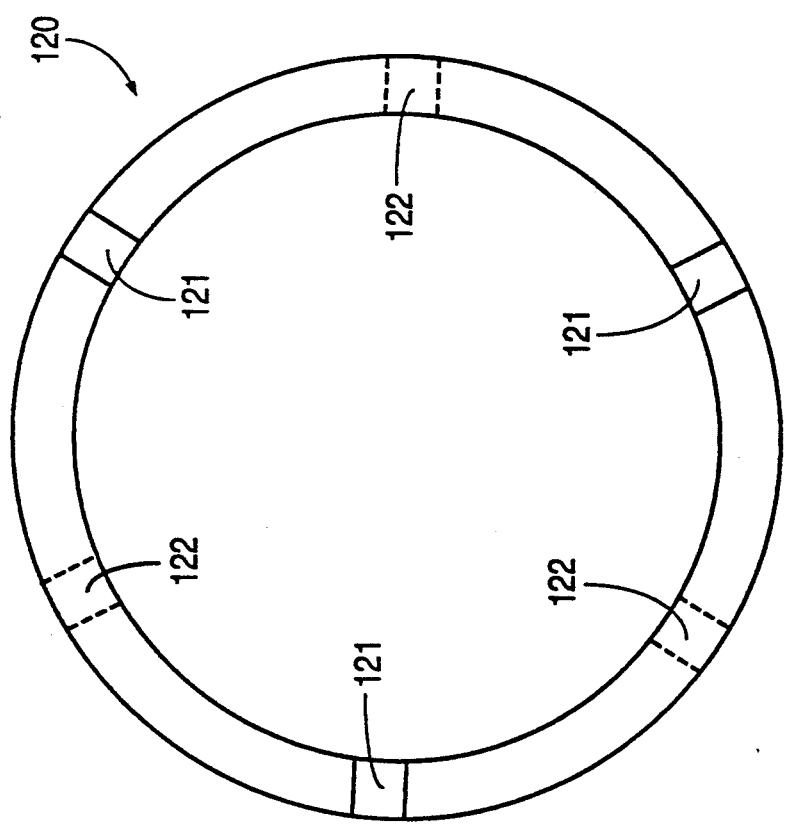

The embodiment of FIG. 12 is similar to that of FIG. 11, except that solid spacer 117 has been replaced by an axial spring 120. Axial spring 120, which is pictured in FIGS. 12B and 12C, is made of a plastic material and contains three upward projections 121 and three downward projections 122. Axial spring 120 is sized such that when flange 118 is tightened a proper axial force is imposed on disks 81 and 82 by projections 121 and 122, respectively. Clamp 110 imposes only a radial force on disks 81 and 82.

Figure 13:
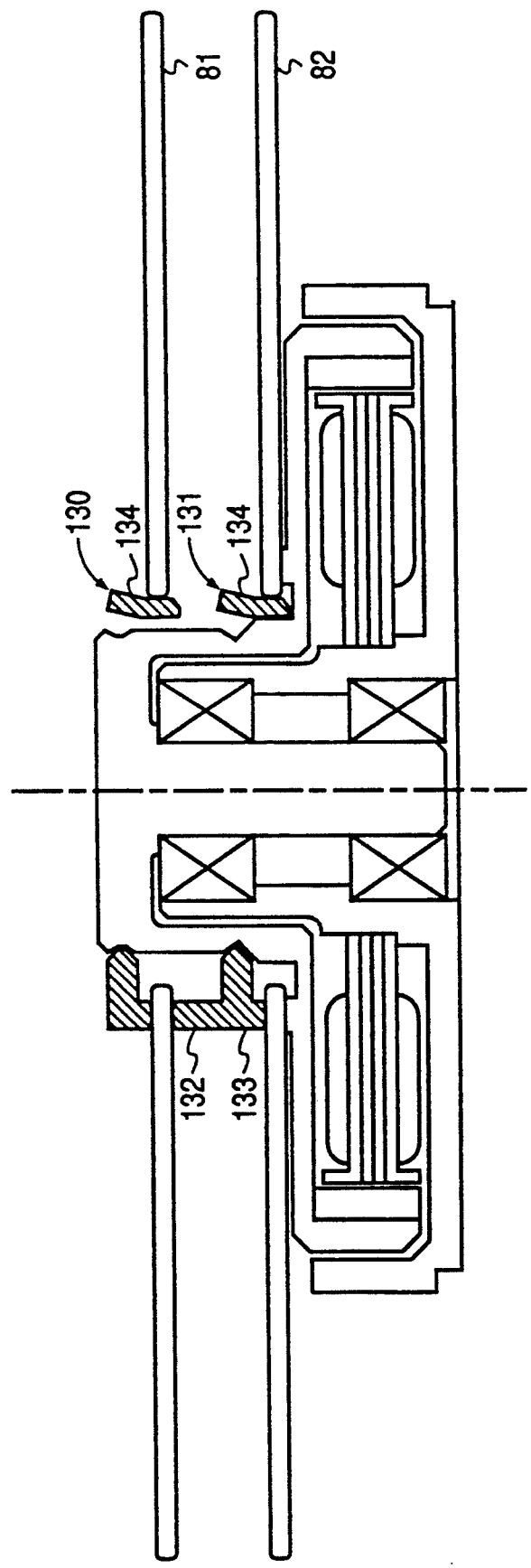

FIG. 13 shows another embodiment of a two-disk arrangement. Upper clamp 130 is similar to clamp 10. Lower clamp 131 is also similar to clamp 10, except that a projection 132 extends upward from each of L-shaped legs 133. Upper disk 81 is supported by projections 132. Fingers 134 on clamps 130 and 131 are substantially similar to fingers 12 on clamp 10.

FIG. 14 illustrates a two-disk arrangement in which disks 81 and 82 are separated by a spacer 140. Clamp 141 has nubs 142 and L-shaped legs 143, which are similar to those in clamp 10 and provide an axial force against disk 81 and (via spacer 140) against disk 82. Clamp 141 contains two sets of fingers. Three shorter fingers 144 contact the inside edge of disk 81, and three longer fingers 145 contact the inside edge of disk 82. Shorter fingers 144 and longer fingers 145 apply radial forces to disks 81 and 82, respectively, and provide a radial clamping function similar to fingers 12 in clamp 10. If desired, the number of fingers 144 and 145 may be increased.

The embodiments described above are intended to be illustrative and not limiting. Numerous other embodiments will be apparent to those skilled in the art, all of which are within the broad scope of this invention.

I claim:

1. A clamp for mounting an information storage disk on a hub, said disk having an inside edge, said clamp comprising:
   an annular element;
   a plurality of fingers extending from said annular element, each of said fingers for imposing a radial force on the inside edge of said disk;
   a plurality of legs, each of said legs for imposing an axial force on said disk, said legs extending outwardly from said annular element; and
   a plurality of nubs extending inwardly from said annular element for making contact with said hub;
   wherein said annular element is formed of a resilient material such that said annular element may be deformed radially outward in regions around said nubs when said annular element is mounted on said hub.

2. The clamp of claim 1 wherein said fingers are positioned at locations between said nubs on said annular element and said annular element is capable of being twisted in regions between said nubs and adjacent ones of said fingers.

3. The clamp of claim 2 wherein said annular element has a central axis and said fingers extend from said annular element in a direction substantially parallel to said central axis.

4. The clamp of claim 1 wherein the arithmetic sum of said radial forces is greater than the sum of said axial forces.

5. The clamp of claim 1 comprising a plurality of nubs extending inwardly from said annular element for making contact with said hub.

6. The clamp of claim 5 wherein said legs and said nubs are placed at the same angular positions on said annular element.

7. The clamp of claim 6 wherein said nubs are in contact with an inclined surface on said hub, the contact between said nubs and said inclined surface causing said legs to impose axial forces on said disk.

8. The clamp of claim 7 wherein said legs are L-shaped.

9. The clamp of claim 3 wherein said fingers are inclined away from said axis.

10. The clamp of claim 1 comprising three of said legs and six of said fingers.

11. A combination comprising:
    a hub of a disk drive spindle;
    an information storage disk;
    a clamp, said clamp comprising:
       an annular element having a central axis;
       a plurality of fingers extending from said annular element in a direction substantially parallel to said central axis, each of said fingers imposing a radial force against an inside edge of said disk;
       a plurality of nubs extending radially inward from said annular element, said nubs being in contact with an inclined surface of said hub;
       a plurality of legs extending from said annular element, each of said legs imposing an axial force so as to push said disk against a surface of said hub;
       said clamp comprising a spring-like material.

12. The combination of claim 11 wherein the arithmetic sum of said radial forces is greater than the sum of said axial forces.

13. The combination of claim 12 wherein said legs are L-shaped.

14. The combination of claim 11 wherein said combination comprises a plurality of said disks and a plurality of said clamps, each of said clamps being used to hold a respective one of said disks on said hub.

15. The combination of claim 14 wherein one of said clamps is inverted with respect to another of said clamps.

16. The combination of claim 14 wherein at least one of said clamps includes a means for maintaining a predetermined spacing between two of said disks.

17. The combination of claim 14 wherein said hub is divided into a plurality of parts oriented coaxially with respect to said central axis, each of said clamps being used to hold a respective one of said disks on a respective one of said parts.

18. A clamp for mounting a pair of information storage disks on a hub, each of said disks having an inside edge, said clamp comprising:
    an annular element having a central axis;
    a first set of fingers extending from said annular element in a first direction substantially parallel to said central axis, each finger in said first set of fingers being for imposing a radial force on an inside edge of a first disk; and
    a second set of fingers extending from said annular element in a second direction substantially parallel to said central axis and opposite to said first direction, each finger in said second set of fingers being for imposing a radial force on an inside edge of a second disk.

19. The clamp of claim 18 wherein said clamp comprises a spring-like material.

20. A combination comprising:
   the clamp of claim 18;
   a hub;
   a pair of information storage disks;
   means for maintaining said information storage disks at a predetermined spacing from each other; and
   a means for imposing a force parallel to said central axis on one of said disks.

21. The combination of claim 20 wherein said annular spacer comprises an axial compression spring.

22. The combination of claim 21 wherein said axial compression spring comprises an annular member, a first set of projections extending substantially in said first direction from said annular member, and a second set of projections extending substantially in said second direction from said annular member, said axial compression spring comprising an elastic material.

23. The combination of claim 22, wherein said axial compression spring comprises plastic.

24. The clamp of claim 1 wherein said clamp is for mounting a pair of said information storage disks and wherein said plurality of fingers comprises a first set of fingers for imposing a radial force on the inside edge of a first information storage disk and a second set of fingers for imposing a radial force on the inside edge of a second information storage disk, said first set of fingers being longer than said second set of fingers.

25. A combination comprising:
   the clamp of claim 24;
   a hub;
   a pair of information storage disks;
   means for maintaining said information storage disks at a predetermined spacing from each other.

26. A clamp for mounting an information storage disk on a hub, said disk having an inside edge, said clamp comprising:
   an annular element;
   a plurality of fingers extending from said annular element, each of said fingers for imposing a radial force on the inside edge of said disk;
   a plurality of legs, each of said legs for imposing an axial force on said disk, said legs extending outwardly from said annular element; and
   a plurality of nubs extending inwardly from said annular element for making contact with said hub, said legs and said nubs being placed at the same angular positions on said annular element;
   wherein, when said nubs are in contact with an inclined surface on said hub, the contact between said nubs and said inclined surface causes said legs to impose axial force on said disk.

27. The clamp of claim 26 wherein said legs are L-shaped.

28. A clamp for mounting a pair of information storage disks on a hub, said disks having respective inside edges, said clamp comprising:
   an annular element; and
   a plurality of fingers extending from said annular element; and
   a plurality of legs, each of said legs for imposing an axial force on one of said disks, said legs extending outwardly from said annular element;
   wherein said plurality of fingers comprises a first set of fingers for imposing a radial force on the inside edge of one of said information storage disks and a second set of fingers for imposing a radial force on the inside edge of the other of said information storage disks, said first set of fingers being longer than said second set of fingers.

29. A combination comprising:
   the clamp of claim 28;
   a hub;
   a pair of information storage disks; and
   means for maintaining said information storage disks at a predetermined spacing from each other.

* * * * *

UNITED STATES PATENT AND TRADEMARK OFFICE
CERTIFICATE OF CORRECTION

PATENT NO. : 5,243,481

DATED : September 7, 1993

INVENTOR(S) : James A. Dunckley and Robert A. Alt

It is certified that error appears in the above-indentified patent and that said Letters Patent is hereby corrected as shown below:

Col. 3, line 32, delete "F" and insert --$F_v$--.

Col. 4, line 43 (equation 2), after "$\mu$hd" insert --+--.

Col. 4, line 45, and line 63 delete "F" and insert --$F_f$--.

Col. 5, line 33, delete "Young'odulus" and insert --Young's modulus--.

Col. 5, line 51, delete "Written" and insert --written--.

Col. 6, line 32, delete "82" and insert --83--.

Col. 6, line 32, delete "83" and insert --84--.

Col. 6, line 32, delete "84" and insert --85--.

Col. 6, line 33, delete "83" and insert --84--.

Col. 6, line 44, delete "11" and insert --11A--.

Col. 7, line 4, delete "12" and insert --12A--.

UNITED STATES PATENT AND TRADEMARK OFFICE
CERTIFICATE OF CORRECTION

PATENT NO. : 5,243,481

DATED : September 7, 1993

INVENTOR(S) : James A. Dunckley and Robert A. Alt

It is certified that error appears in the above-indentified patent and that said Letters Patent is hereby corrected as shown below:

Fig. 8, change the reference numeral "35" to --85--.

Fig. 9, change the reference numeral "84" to --92--.

Fig. 11A, change the reference numeral "119" to --117--.; and change the reference numeral "120" to --118--.

Fig. 12A, change the reference numeral "212" to --121--.

Signed and Sealed this

Twenty-fifth Day of April, 1995

Attest:

BRUCE LEHMAN

Attesting Officer

Commissioner of Patents and Trademarks